US007337404B2

(12) United States Patent
Rollins

(10) Patent No.: US 7,337,404 B2
(45) Date of Patent: Feb. 26, 2008

(54) GRAPHICAL REPRESENTATION OF SYSTEM INFORMATION ON A REMOTE COMPUTER

(75) Inventor: Doug L. Rollins, Nampa, ID (US)

(73) Assignee: Micron Technology, Inc., Boise, ID (US)

(*) Notice: Subject to any disclaimer, the term of this patent is extended or adjusted under 35 U.S.C. 154(b) by 911 days.

(21) Appl. No.: 10/690,834

(22) Filed: Oct. 21, 2003

(65) Prior Publication Data

US 2004/0109018 A1 Jun. 10, 2004

Related U.S. Application Data

(63) Continuation of application No. 09/247,615, filed on Feb. 10, 1999, now Pat. No. 6,664,988.

(51) Int. Cl.
*G06F 15/00* (2006.01)
*G06F 13/00* (2006.01)

(52) U.S. Cl. ...................................... 715/747; 715/762

(58) Field of Classification Search ........ 715/762-765, 715/735-740, 744, 853, 854, 705, 739
See application file for complete search history.

(56) References Cited

U.S. PATENT DOCUMENTS 4,034,194 A 7/1977 Thomas et al.
4,334,307 A 6/1982 Bourgeois et al.
4,433,413 A 2/1984 Fasang
4,819,162 A 4/1989 Webb, Jr. et al.
4,881,230 A 11/1989 Clark et al.
4,964,125 A 10/1990 Kim
5,010,551 A 4/1991 Goldsmith et al.
5,068,787 A 11/1991 Pipella et al.
5,182,705 A 1/1993 Barr et al.
5,455,933 A 10/1995 Schieve et al.
5,459,657 A 10/1995 Wynn et al.
5,463,766 A 10/1995 Schieve
5,491,791 A 2/1996 Glowny et al.

(Continued)

OTHER PUBLICATIONS

Bandy, B. and B. Smith, Software Product Description and Features, 12 pages, Copyright 1996, "YAK—Winsock Personel Chat Program and Multi-Document Text Editor—Version 1.0 beta."

(Continued)

*Primary Examiner*—Cao (Kevin) Nguyen
(74) *Attorney, Agent, or Firm*—Knobbe, Martens, Olson & Bear LLP

(57) ABSTRACT

A method and apparatus for gathering system information into a file and transmitting the file to a remote location for presentation as a graphical display. A computerized diagnostic tool, can assist a support person in providing technical support to an end user in connection with the configuration of a remote computer. System information relating to a particular customer's computer can be stored for subsequent reference. Computer program code running on a source computer can direct a source computer to self-survey system information. Program code creates a file containing system information and transmits the system information file to a remote computer separate from the source computer. Transmission may be accomplished via any effective transmission medium such as the Internet. Computer program code on the remote computer then displays a graphical representation of the system information.

31 Claims, 5 Drawing Sheets

U.S. PATENT DOCUMENTS

| | | | | |
|---|---|---|---|---|
| 5,493,492 | A | | 2/1996 | Cramer et al. |
| 5,508,977 | A | | 4/1996 | Tymn |
| 5,519,832 | A | | 5/1996 | Warchol |
| 5,521,842 | A | | 5/1996 | Yamada |
| 5,572,643 | A | * | 11/1996 | Judson ....................... 709/218 |
| 5,646,839 | A | | 7/1997 | Katz |
| 5,696,702 | A | | 12/1997 | Skinner et al. |
| 5,706,457 | A | | 1/1998 | Dwyet et al. |
| 5,710,887 | A | | 1/1998 | Chelliah et al. |
| 5,715,374 | A | | 2/1998 | Heckerman et al. |
| 5,720,001 | A | | 2/1998 | Nguyen |
| 5,764,916 | A | | 6/1998 | Busey et al. |
| 5,771,354 | A | | 6/1998 | Crawford |
| 5,784,539 | A | | 7/1998 | Lenz |
| 5,794,237 | A | | 8/1998 | Gore, Jr. |
| 5,802,493 | A | | 9/1998 | Sheflott et al. |
| 5,802,504 | A | | 9/1998 | Suda et al. |
| 5,838,682 | A | | 11/1998 | Dekelbaum et al. |
| 5,842,181 | A | | 11/1998 | Fanjoy |
| 5,884,045 | A | | 3/1999 | Kurihara |
| 5,903,642 | A | | 5/1999 | Schwartz et al. |
| 5,915,010 | A | | 6/1999 | McCalmont |
| 5,918,207 | A | | 6/1999 | McGovern et al. |
| 5,959,621 | A | * | 9/1999 | Nawaz et al. ............... 715/733 |
| 5,960,170 | A | | 9/1999 | Chen et al. |
| 5,970,468 | A | | 10/1999 | Bull |
| 5,983,364 | A | | 11/1999 | Bortcosh et al. |
| 6,014,658 | A | | 1/2000 | Pretz |
| 6,133,985 | A | | 10/2000 | Garfinkle et al. |
| 6,160,551 | A | | 12/2000 | Naughton et al. |
| 6,247,149 | B1 | | 6/2001 | Falls et al. |
| 6,421,694 | B1 | | 7/2002 | Nawaz et al. |

OTHER PUBLICATIONS

Office of Automation Concepts Implementation, User's Guide, pp. 1-17, Oct. 11, 1982, "Palm 3."

Micron Electronics, Inc.—Assignee, U.S. Appl. No. 08/956,180, filed oct. 20, 1997, "Method and System for Tracking Employee Productivity Via Electronic Mail."

Micron Electronics, Inc.—Assignee, U.S. Appl. No. 08/964,943, filed Nov. 4, 1997, "Method and System for Tracking Employee Productivity in a Client/Server Environment."

Micron Electronics, Inc.—Assignee, U.S. Appl. No. 09/288,215, filed Apr. 8, 1999, "Method and System for Providing Remote Sales and Technical Support with Face the Customer Feature."

Micron Electronics, Inc.—Assignee, U.S. Appl. No. 09/201,407, filed Nov. 30, 1998, "Self-Importing Change Routines."

Micron Electronics, Inc.—Assignee, U.S. Appl. No. 09/201,536, filed Nov. 30, 1998, "Self-Importing Change Routines."

* cited by examiner

GRAPHICAL REPRESENTATION OF SYSTEM INFORMATION ON A REMOTE COMPUTER

RELATED APPLICATIONS

This application is a continuation of and incorporates by reference in its entirety U.S. application Ser. No. 09/247,615, filed Feb. 10, 1999 now U.S. Pat. No. 6,664,988.

BACKGROUND

The present invention relates generally to computer on-line diagnostics systems, and more specifically, to a graphical representation of system information displayable at a remote location.

Product vendors and technical support services are often looking for new ways to provide more accurate and efficient technical support for computer systems. As part of such support it is, at times, essential for a technician or other support staff to access system information from a remote computer in order to aid in diagnosing problems or configuring a system. In addition, it is preferable that system information be displayed in a manner that is familiar and easy to interpret. A familiar format can reduce time required to train new support personnel and ease of interpretation can facilitate expeditious resolutions of a user's problem.

Providing customer service involves a cost of doing business to a vendor or service provider. The goal of a business is to provide an optimal amount of customer service, resulting in a satisfied customer base, at the lowest possible cost. Service costs and customer frustrations often increase as the time to reach a resolution of a customer's problem increases. Time to resolution can be dependent upon a variety of factors. One problem arises from the proliferation of different computer models and configurations available. This is further implicated by a multitude of options and software that may be installed. Each model and configuration introduces additional variables that must be considered in problem solving. The more variables a support person must consider, the more complex troubleshooting can be. Therefore, it is important that a support person get all of the pertinent information before them in a manner that is timely and user friendly.

Pertinent information comprises hardware and software components and settings. Typically, this information would include, but not be limited to, a list of hardware components such as a system timer, programmable interrupt controller, keyboard, communications ports, sound and multimedia circuitry, video drivers, printer ports, hard drive controllers, floppy drive controllers, mouse ports, clock, numeric data processor, and the corresponding Interrupt Requests (IRQ) and Direct Memory Access (DMA) settings. This information can be critical to providing competent advice on resolving performance issues.

Performance issues may relate to devices or programs that will not operate. In addition, some devices or programs may operate sporadically or simply not meet a user's expectations.

It is well known to compile and display system information on a computer from which they are gleaned. Diagnostic type programs and operating systems are known to make system information available to a technician when a technician has physical access to a computer involved. Many diagnostic programs can display information and even perform diagnostic routines checking for conflicts, inoperable components, and the like. However, since physical access is required, a technician must make an on-site call or a computer must be shipped to a depot for service. With a recent proliferation of computers, and in particular, proliferation of low cost computers at a multitude of sites, it has become impractical to send a technician to every location for on-site service. It is also preferable to avoid the inconvenience and cost of shipping a computer to a remote depot as well as incurring the loss of productivity sustained while a computer is thus removed. In order to maintain customer satisfaction it becomes important for vendors and service providers to effect an expeditious means of conveying required information to support personnel at a remote site. Therefore, it is desirable to gather system information effectively and transfer it to a remote site from which a diagnosis may be performed.

One method of performing diagnostics remotely is to utilize a dedicated software package to enable a remote technician to connect via modem and essentially control a computer from a remote site. However, that solution typically requires that proprietary software be running at both the remote site and the service location. In addition a learning curve for teaching a user at the remote site how to set up and operate the proprietary software must also be considered.

Another approach is to have a support person "walk through" a routine with a user during a telephone conversation. However, this is inefficient because users are often unfamiliar with the types of routines that must be performed and the technical information that must be conveyed to the support person. Often an obvious problem that would be apparent to a skilled person viewing a screen goes unnoticed by a user taking verbal instructions from a remote support person and reporting back the results. Requiring in depth user interaction can also increase customer frustration and jeopardize a vendor or service company's client base.

It would be useful to have a means of quickly compiling system information from a user's computer and efficiently sending such compiled information to a support location for display and diagnosis. It would be most useful to have system information displayed in a graphical manner at a remote support location wherein the system information is easily interpreted by a support person thereby aiding quick resolution to a computer problem.

SUMMARY OF THE INVENTION

Accordingly, the present invention provides a method and apparatus for gathering system information into a file and effectively transmitting the system information file 9 to a remote location where it can be presented as a graphical display 10 of the system information. A computerized diagnostic tool is provided that can be used to assist a support person offering technical support to an end user in connection with the configuration of a remote computer. System information relating to a particular customer's computer can also be stored for subsequent reference.

In one implementation the computerized diagnostic tool includes a system that can store, display and process system information. Computer program code running on a source computer directs the source computer to survey system information on the source computer. Following the survey, the program code creates a system information file 9 containing the information surveyed. The system information file 9 can be transmitted to a remote computer separate from the source computer. Transmission may be accomplished via any effective transmission medium such as the Internet or direct dial up transfer. Once transmission is complete computer program code on the remote computer can display a graphical representation of the system information originating from the source computer. Preferably the program code on the source computer is capable of compressing the system information file 9 in order to facilitate transmitting.

In addition, the computerized diagnostic tool can store customer system information in an appropriately identified file so that system information for a particular end user may be accessed at some later time. Storage can be in any suitable archival medium such as a hard drive, removable drive media, or a compact disc (CD). Archival files may also be databased to more readily identify and access a particular file. Advantages associated with graphically representing system information from a remote computer include quick and efficient diagnosis of a customer's problem resulting in improved customer service and satisfaction.

Still other features and advantages of the present invention will become readily apparent to those skilled in this art from the following detailed description in which the preferred embodiment of the invention is shown by way of illustration of the best mode contemplated of carrying out the invention.

DETAILED DESCRIPTION

Figure 1:
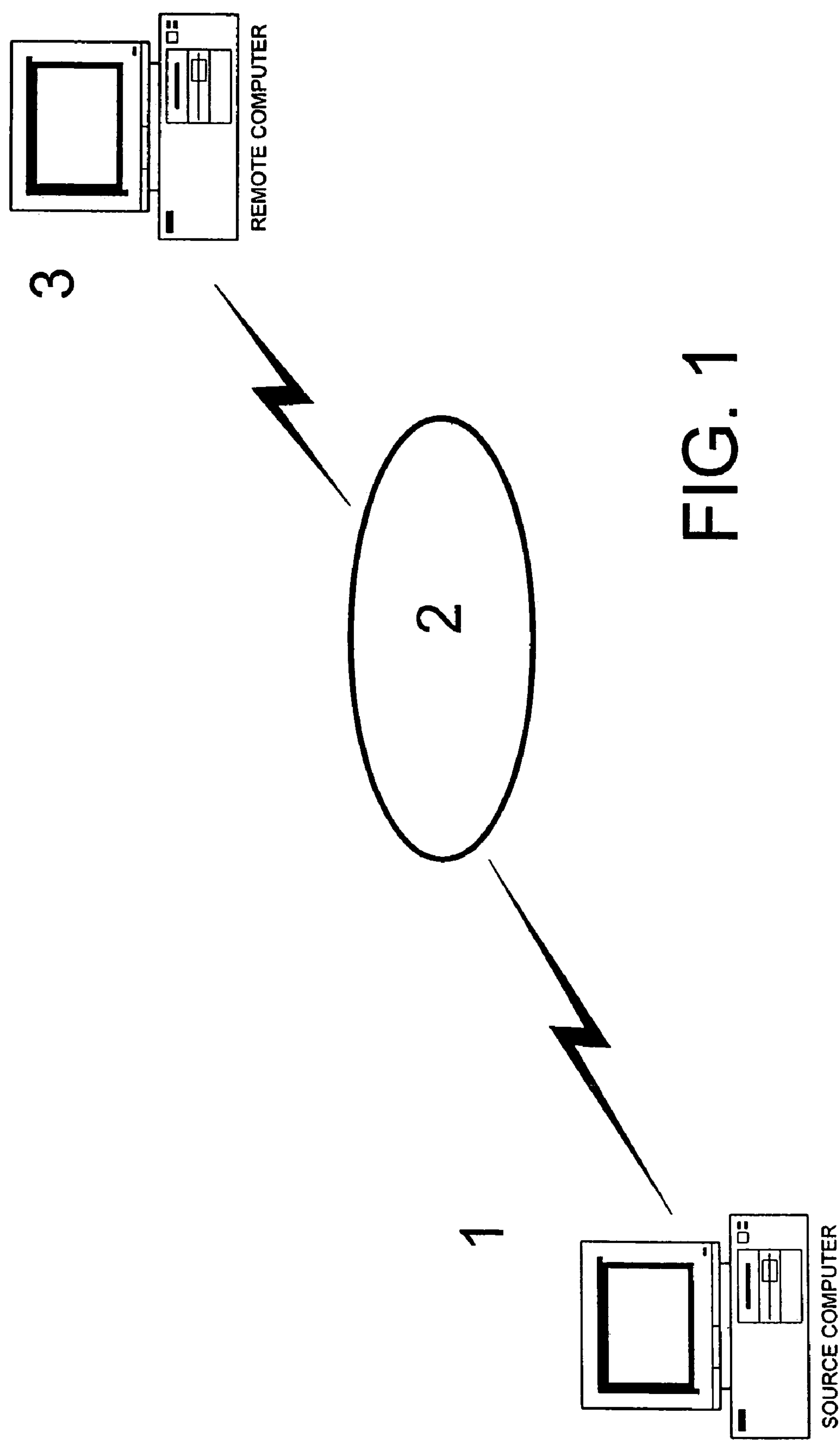
FIG. 1 illustrates a computer system according to the invention.
Figure 2:
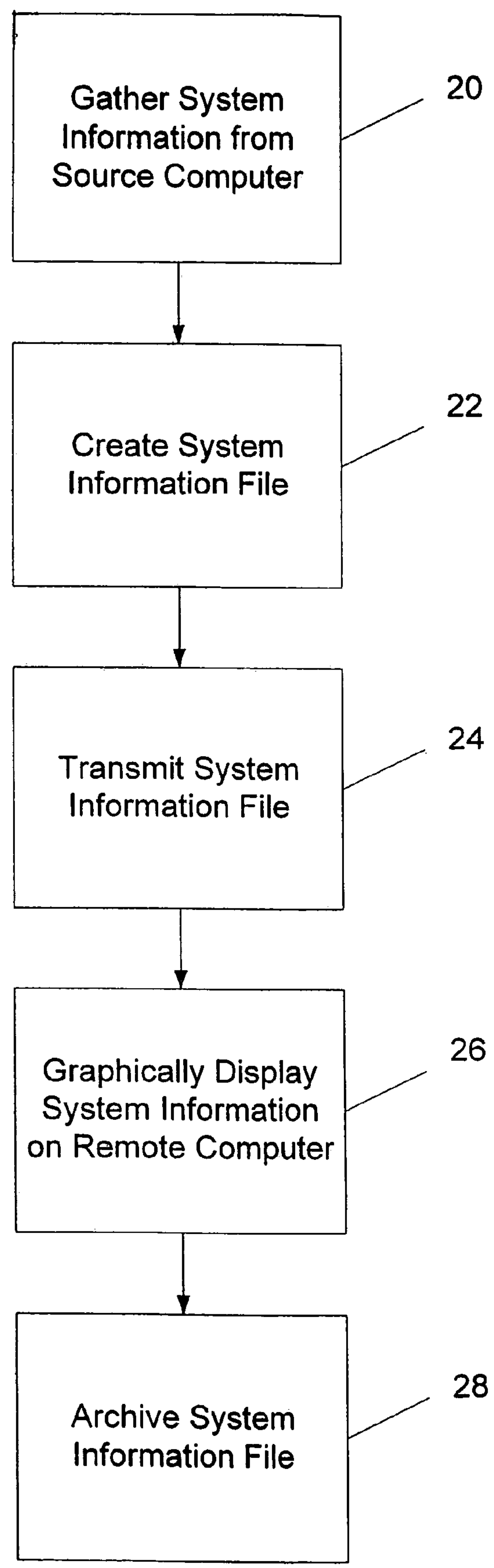
FIG. 2 is a flow diagram showing the collection, transmission and graphical display of system data according to the invention.
Figure 3:
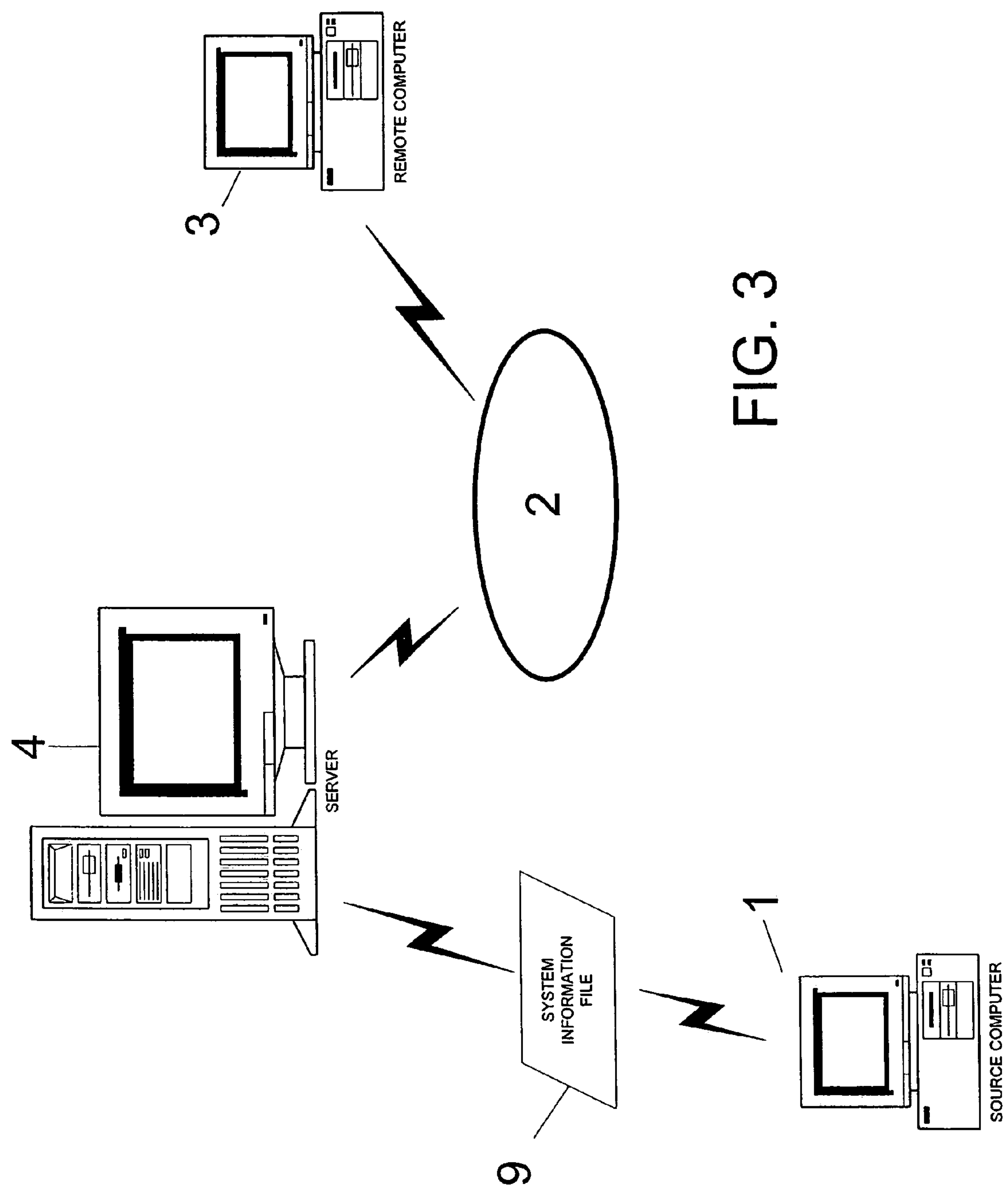
FIG. 3 illustrates a computer system including a file server.

FIG. 1 illustrates an exemplary computer system environment including a source computer 1, a transmission medium 2, and a remote computer 3. In general as shown in FIG. 2 a source computer 1 gathers system information from the source computer (step 20) and generates a system information file 9 (step 22). The source computer 1 then transmits the system information file 9 via a transmission medium 2 to a remote computer 3 (step 24). The remote computer 3 can then process the file and create a graphical display 10 of the system information (step 26). This graphical display 10 may be used to diagnose a problem with the source computer, survey components of the source computer 1, archive the source computer configuration, or for other purposes (step 28).

Source computer 1 can be a stand-alone computer or a computer connected to a network via a file server 4 or other networking means such as a peer to peer connection. The source computer 1 comprises a processor such as a central processing unit (CPU) chip; a display such as a flat panel or a cathode ray tube; a storage medium such as a hard drive, memory, compact disc, and the like. Computer program code is typically stored on the storage medium and executed by the processor means. A source computer should be connected to a transmission medium, such as a modem, network connection, or removable media drive.

In one embodiment, source computer 1 is connected to a transmission medium comprising a distributed network, such as the Internet, thereby facilitating ease of communication. An Intranet, local area network, wide area network, dial up access, or other form of networking comprise additional embodiments. Stand-alone computers can transmit via a modem. Modem transmission can include using a modem to connect to a dial-up network connection such as the Internet via an Internet service provider (ISP) or a direct dial up to the remote computer 3. In the absence of any type of network or dial up capability, other techniques can be used to transfer the system information file 9. Alternate transmission means include a removable media in the source computer 1 onto which a system information file 9 can be recorded. The removable media can be removed from the source computer 1 and transported to a remote computer 3.

Transmission of a system information file 9 through use of a distributed network can be accomplished by uploading to and downloading from a mutually accessible storage medium, such as an Internet server or a mapped drive. Source computer 1 can upload a system information file 9 to a mutually accessible storage medium, remote computer 3 can then download the system information file 9, or the mutually accessible storage medium can store the file until a later time. In addition, a mutually accessible storage medium can archive the system information file 9 and retain it for future reference even after a remote computer 3 has downloaded a system information file 9. Alternatively, a remote computer 3 can archive the file, or the file may be erased after graphically displaying the file.

Transmission of a system information file 9 to a remote computer 3 may be accomplished in various ways, including uploading the file to an Internet site, e-mail, and placing of the file in a repository such as an electronic bulletin board or mapped drive. Other methods include copying the system information file 9 onto an electronic media such as a floppy disc, a zip drive or a tape and physically transporting the electronic media to the remote computer 3 so that the remote computer 3 can read the file from the media.

Another transmission medium 2 that can facilitate the transfer of the system information file 9 from the source computer 1 to the remote computer 3 is electronic mail (e-mail). E-mail offers a direct form of communication designating a recipient and can ensure the system information file 9 is presented to the remote computer 3.

A remote computer 3 comprises a processor such as a central processing unit (CPU) chip; a display such as a flat panel or a cathode ray tube; a memory medium including at least one hard drive and random access memory, compact disc, and the like. The remote computer 3 should also be connected to a transmission medium, such as a modem, network connection, or removable media drive. Remote computer 3 should be configured to receive data from the medium used to transmit data from the source computer 1. Both source computer 1 and remote computer 3 can be connected via a distributed network, such as the Internet. The Internet offers a familiar means of communicating and can facilitate transmission of a system information file 9. In addition the Internet is flexible in connection types and location.

Computer program code may be used to perform any number of the steps of gathering the system information from the source computer, transmitting the system information file 9 to a remote computer, or graphically displaying the system information file 9 on the remote computer. Computer program code may also be used to automate the entire method or any portion thereof. The computer program code can reside on the computer in which it is being executed or on other accessible storage medium.

In one embodiment computer program code is stored on an Internet or Intranet server 4 (FIG. 2) which can be accessed by the source computer 1. A source computer 1 can execute code on an Internet server 4 to effectuate gathering of system information from the source computer into a system information file 9. The system information file 9 can then be transmitted to a remote computer 3. Additional computer program code on Intranet server 4 can be executed to facilitate the transmission of system information file 9 to remote computer 3. Program code used to facilitate transmission may be executed by a source computer 1 or a remote computer 3.

In one implementation, remote computer 3 accesses program code on an Internet server to cause a graphical display 10 on remote computer 3. The graphical display 10 graphically represents system information from a source computer 1. In this implementation system information file 9 is never transmitted to the remote computer 3, only a graphical display 10 is transmitted from the Internet server 4 to the remote computer. In another embodiment, source and remote computers are given multiple options, to compile, send, display, etc. by executing program code.

Source computer 1 should generate a system information file 9 that accurately describes the system components and configuration of the source computer. The configuration includes specifications technically describing each component. In one embodiment, system information file 9 is generated by execution of computer program code located in a storage medium comprising source computer 1. Computer program code to generate the system information file 9 can also be downloaded from a network server to the source computer.

Alternatively program code to generate a system information file 9 may be executed from a network server or a removable media inserted into the source computer 1 such as a floppy disk, a magnetic tape, a CD, or even a Read Only Memory (ROM) module. Execution of computer program code causes the source computer 1 to survey itself and collect information describing its configuration and generate a system information file 9 comprising the collected information. FIG. 2 shows a diagram of a logical flow of a preferred embodiment, including the collection of the system information, generation of the system information file 9, transmission of the file to a remote computer 3, and graphical display 10 of the source computer 1 system information on the remote computer 3.

The system information file 9 includes technical information describing the configuration and elements comprising the source computer. This information can include data relating to hardware components such as a system timer, programmable interrupt controller, keyboard, communications ports, sound and multimedia circuitry, display adapters, video drivers, printer ports, hard drive controllers, hard disks, floppy drive controllers, floppy drives, CDROM controllers and drive units, modems, network adapters, Small Computer Standard Interface (SCSI) controllers and devices, mouse ports, clock, numeric data processor, Interrupt Requests (IRQ) and Direct Memory Access (DMA) settings as well as other components.

With a system information file 9 successfully transferred to remote computer 3, remote computer 3 can process the information contained in the system information file 9 and generate a graphical representation of source computer 1 system information. Remote computer 3 can have a blank template 11 (FIG. 4) illustrating a computer 5 and typical component types with blanks 6 ready to display information from a source computer 1. System information file 9 can then be pulled into the blank template 11 via computer program code to display remote computer 3's system information graphically. A user activatible control such as an icon 12 that responds to being clicked upon with a pointing device can be used to display specifications associated with the actual installed components of a source computer.

Figure 5:
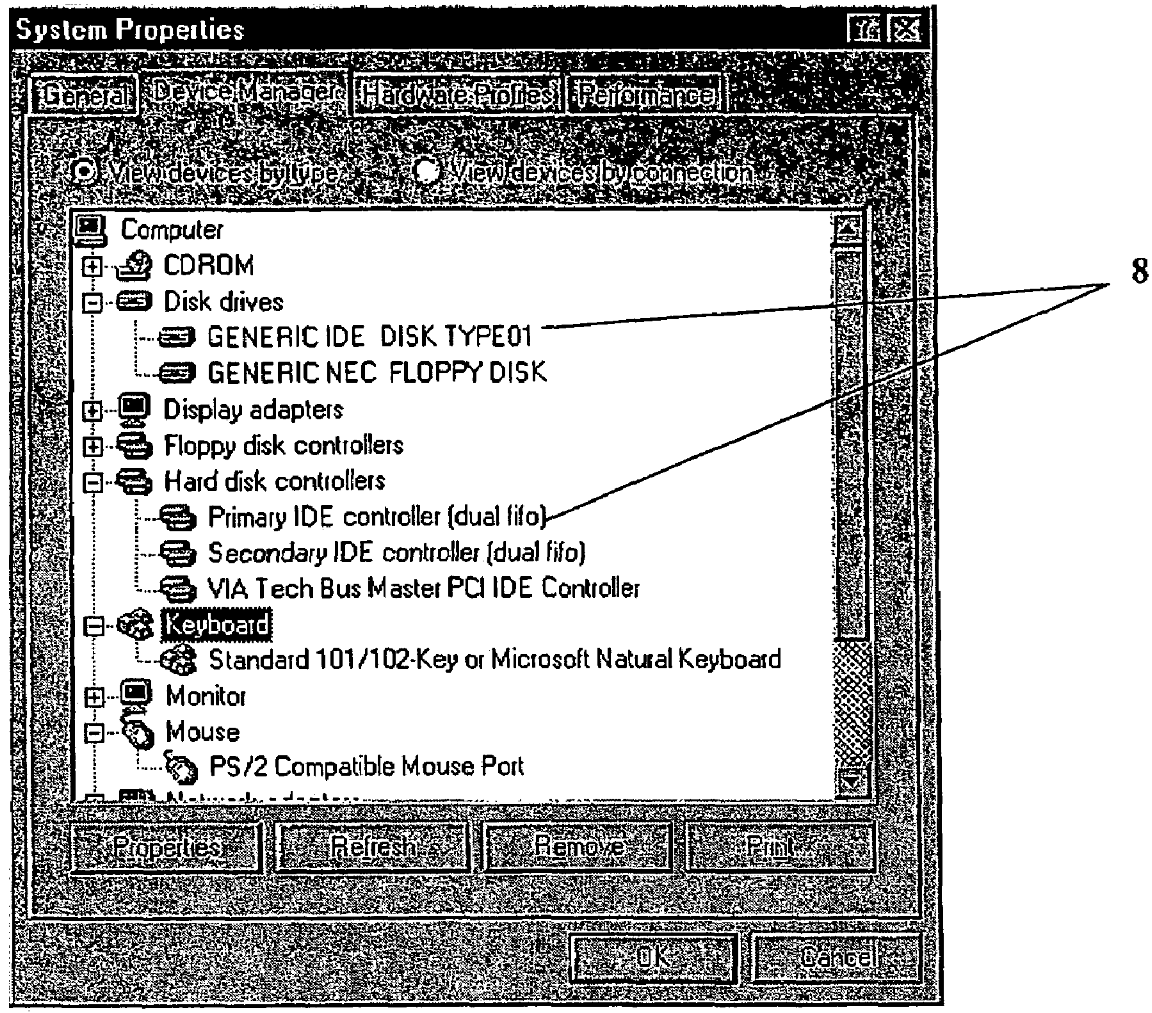
FIG. 5 is an illustration of system properties screen in which information has been loaded.

The graphical representation of the system information can include icons 12 depicting individual components or features displayed in a hierarchical layout. Each icon lists a component type 8 with each component type 8 then listed under the icon 12 (FIG. 5). Additional user activatible controls such as a push button 7 can be used to execute computer readable program code and thereby, perform a desired computer function such as print the system information.

Supporting details relating to a particular component or feature may be displayed by selecting the icon and opening it. Opening the icon may be accomplished by a user interactive control such as clicking or double clicking on an icon with a pointing device associated with remote computer 3 or tabbing to the icon with a tab key and hitting the enter key on a keyboard associated with remote computer 3.

Icons can be arranged in a logical sequence that will aid in the identification of a particular resource. Icons may be hierarchically arranged such that like devices are grouped under a common heading. As an example, disk drives may be sequentially arranged under a common icon entitled Disk Drives. Similarly, communications ports may be sequentially arranged under a common icon. Selection of an icon can open a tree of icons one level subservient to the selected icon and on the final level display information relating to the chosen entity.

Examples of available utilities suitable for the survey of source computer 1 and generation of system information file 9 include the "Winrep" and "Dosrep" support tools included as part of the Windows 98™ operating system. These support tools can be executed causing them to gather information from source computer 1 and store the gathered information in a system information file 9. In the case of Winrep or Dosrep the file is a Microsoft™ system information file. Other utilities may generate a different file format but include similar information.

To further facilitate the transmission of system information file 9, system information file 9 can be compressed using one of many well known compression utilities. For example, Winrep typically compresses system information into a Microsoft™ compressed ".cab" file. Transmission may then be accomplished by any of the techniques discussed above. In one embodiment, a utility such as Winrep is started from an Internet or Intranet site page using ActiveX controls and scripting. In this manner, a user of a source computer 1 can play a minimal role in the creation and transmission of the file. The ActiveX controls and scripting can include programming to specify the destination of the report, thereby by causing system information file 9 to be generated and transmitted directly to remote computer 3.

Figure 4:
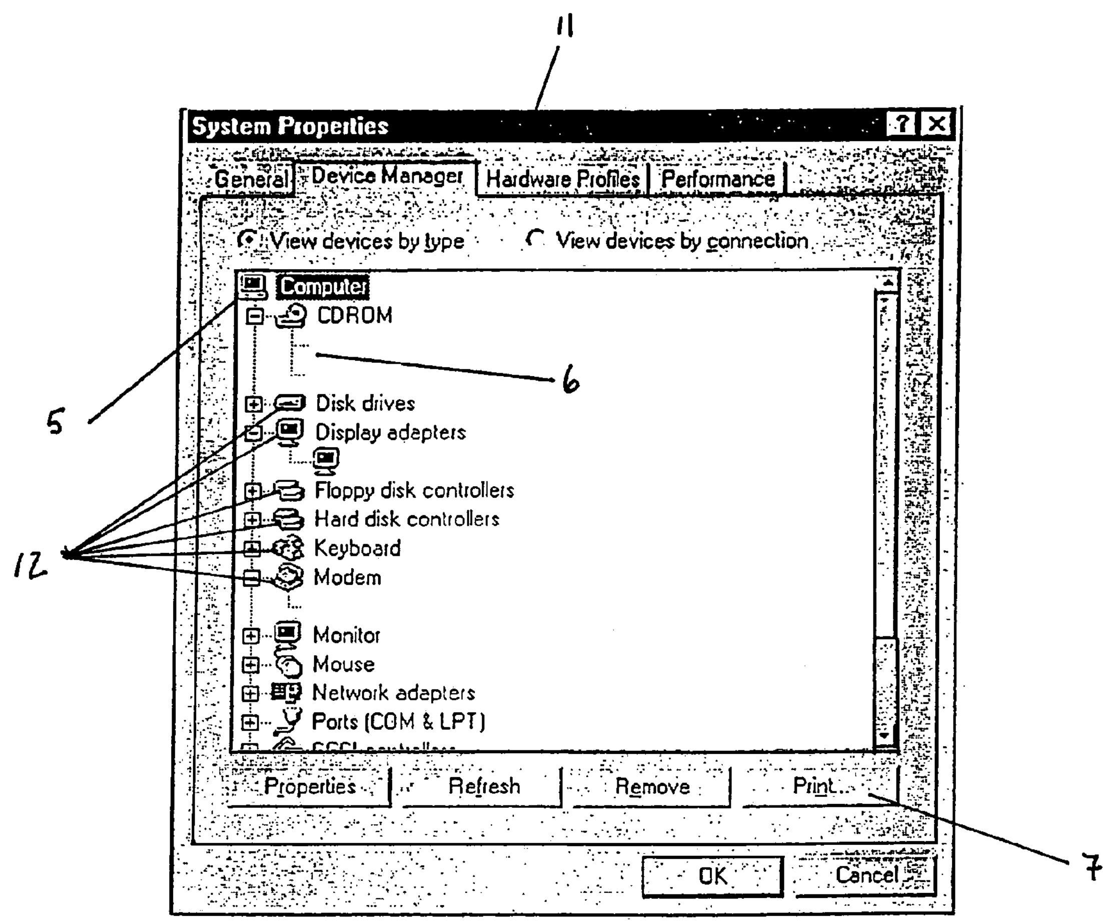
FIG. 4 is an illustration of a system properties screen without system information.

Subsequent to receipt of system information file 9 by remote computer 3, graphical display 10 of the system properties can be displayed. FIG. 4 is an illustration of a graphical display screen template devoid of any system information. A template such as the one depicted in FIG. 4 can be populated by "pulling" a system information file 9. Pulling of system information file 9 parses a compressed file such as a .cab file for relevant data. Relevant data is used to populate a graphical display 10 template with appropriate icons and detail information describing those icons. By pulling a particular system information file 9 describing a particular source computer, a remote computer 3 can graphically display the configuration of that source computer.

Other implementations are within the scope of the following claims.

What is claimed is:

1. A computerized diagnostic tool for displaying system information on a graphical display comprising:

a first electronic device that is configured to receive system information from a second separate source electronic device, wherein the system information identifies at least one of hardware components that reside in the source electronic device and a configuration of the source electronic device, and wherein the first electronic device displays a graphical representation of the system information of the source electronic device.

2. The diagnostic tool of claim 1, wherein the receipt of the system information is activated by an action occurring on the source electronic device.

3. The diagnostic tool of claim 1, wherein the system information is received via electronic mail.

4. The diagnostic tool of claim 1, wherein the system information file is stored on an archival mechanism for subsequent reference.

5. The diagnostic tool of claim 4, wherein the archival mechanism is a system information database.

6. The diagnostic tool of claim 1, wherein the graphical representation of the system information comprises icons to represent system components arranged in a hierarchical order.

7. The diagnostic tool of claim 1, wherein the graphical representation of the system information comprises a template populated with icons.

8. A method of graphically representing system information of a source electronic device on a remote computer comprising:

receiving gathered system information from the source electronic device, wherein the system information identifies at least one of hardware components that reside in the source electronic device and a configuration of the source electronic device; and displaying a graphical representation of the system information contained in the system information file on the remote computer.

9. The method of claim 8, further comprising storing the system information file in a system information database.

10. The method of claim 9, wherein receiving the system information file is accomplished via the Internet.

11. The method of claim 9, wherein displaying a graphical representation comprises providing a template populated with icons, each icon representing items contained in the system information.

12. A program storage device storing instructions that when executed performs the method comprising:

receiving gathered system information from a source electronic device, wherein the system information identifies at least one of hardware components that reside in the source electronic device and a configuration of the source electronic device; and displaying a graphical representation of the system information contained in the system information file on a separate remote computer.

13. The program storage device of claim 12, further comprising storing the received system information in a system information database.

14. The program storage device of claim 12, wherein receiving the system information file is accomplished via the Internet.

15. The program storage device of claim 12, wherein displaying a graphical representation comprises providing a template populated with icons, each icon representing items contained in the system information.

16. A programmed computer for graphically displaying system information gathered by and received from a separate source electronic device, the programmed computer comprising:

memory configured to store computer readable program code;

a processor for executing computer readable program code stored in said memory;

a system information file transmitted from a separate source electronic device, wherein the system information identifies at least one of hardware components that reside in the source electronic device and a configuration of the source electronic device; and a display adapted to display visual images representative of the system information, wherein the processor is responsive to a command to graphically display the information contained in the system information file on the display.

17. The programmed computer of claim 16 wherein the graphical display of information contained in the system information file is hierarchically arranged.

18. A computer executing a diagnostic tool for displaying system information on a graphical display comprising:

a first electronic device configured to gather system information from a separate second electronic device, wherein the gathered system information identifies at least one of hardware components that resides in the separate second electronic device and a configuration of the second electronic device, and wherein the second electronic device is configured to transmit, and wherein the first electronic device is configured to receive and display said system information.

19. The computer of claim 18, wherein the transmission of the system information is accomplished by the second electronic device uploading the system information to an Internet server which is accessible to the first electronic device.

20. The computer of claim 18, wherein the transmission of the system information is accomplished via electronic mail.

21. The computer of claim 18, additionally comprising an archival mechanism for storing the system information.

22. The computer of claim 21, wherein the archival mechanism is a system information database.

23. The computer of claim 18, wherein the system information is displayed in a hierarchical order.

24. The programmed computer of claim 18, wherein the displayed system information file is hierarchically arranged.

25. A method of graphically representing system information comprising:

gathering system information from a first electronic device into a system information file, wherein the system information identifies at least one of hardware components that reside in the first electronic device and a configuration of the first electronic device;

transmitting said system information file to a separate second remote electronic device; and graphically representing the system information file on the remote electronic device.

26. The method of claim 25, further comprising storing the system information file in a system information database.

27. The method of claim 25, wherein the transmitting the system information file is accomplished via the Internet.

28. An article of manufacture comprising a computer storage-usable-medium having a computer readable code embodied therein for displaying system information on a graphical display the computer readable code in said article of manufacture comprising:

computer readable code responsive to a command to gather system information about a first electronic device, wherein the system information identifies at least one of hardware components that resides in the first electronic device and a configuration of the first electronic device; and computer readable code responsive to a command to transmit the system information to a remote second electronic device, wherein the system information is configured to be displayed as a graphical representation on the remote second electronic device.

29. The article of manufacture of claim 28, further comprising a computer readable code means for storing the system information file in a database for subsequent retrieval.

30. The article of manufacture of claim 29, wherein the computer readable code means includes computer readable code for transmitting a system information file from the first electronic device to the second electronic device by electronic transfer over the Internet.

31. A programmed computer for graphically displaying system information gathered by and received from a separate source computer, the programmed computer comprising:

at least one hardware component;

a system information file configured to be transmitted to the programmed computer; wherein the system information identifies at least one of hardware components of the source computer and a configuration of the source computer; and code responsive to receive the system information of the source computer and graphically display an image indicative of the source computer system information.

* * * * *

UNITED STATES PATENT AND TRADEMARK OFFICE

CERTIFICATE OF CORRECTION

PATENT NO. : 7,337,404 B2
APPLICATION NO. : 10/690834
DATED : February 26, 2008
INVENTOR(S) : Rollins It is certified that error appears in the above-identified patent and that said Letters Patent is hereby corrected as shown below:

On the Title Page, in field (56), under “Other Publications”, in column 2, line 2, delete “Personel” and insert -- Personal --, therefor.

In column 9, line 16, in Claim 28, delete “resides” and insert -- reside --, therefor.

Signed and Sealed this

Seventeenth Day of June, 2008

JON W. DUDAS
*Director of the United States Patent and Trademark Office*